(12) United States Patent
You et al.

(10) Patent No.: US 12,391,095 B2
(45) Date of Patent: Aug. 19, 2025

(54) AIR CONDITIONER FOR VEHICLE

(71) Applicant: Hanon Systems, Daejeon (KR)

(72) Inventors: Jae-Chun You, Daejeon (KR); Yo Chan Min, Daejeon (KR); Tae Yong Park, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 464 days.

(21) Appl. No.: 17/908,322

(22) PCT Filed: Mar. 5, 2021

(86) PCT No.: PCT/KR2021/002767
§ 371 (c)(1),
(2) Date: Aug. 31, 2022

(87) PCT Pub. No.: WO2021/177788
PCT Pub. Date: Sep. 10, 2021

(65) Prior Publication Data
US 2023/0147139 A1    May 11, 2023

(30) Foreign Application Priority Data
Mar. 6, 2020    (KR) .................. 10-2020-0028234

(51) Int. Cl.
*B60H 1/00*      (2006.01)
*B60H 1/32*      (2006.01)

(52) U.S. Cl.
CPC ....... B60H 1/00821 (2013.01); B60H 1/3227 (2013.01); *B60H 2001/3286* (2013.01)

(58) Field of Classification Search
CPC ............. B60H 1/00821; B60H 1/3227; B60H 200/3286

USPC ........................................................ 454/143
See application file for complete search history.

(56) References Cited

U.S. PATENT DOCUMENTS

| | | | |
|---|---|---|---|
| 5,803,160 A | 9/1998 | Danieau | |
| 8,268,470 B2* | 9/2012 | Matsumoto | H01M 8/04014 429/513 |
| 9,694,668 B1* | 7/2017 | Yun | B60K 11/06 |
| 11,220,153 B2* | 1/2022 | Omori | B60H 1/00849 |
| 11,654,744 B2* | 5/2023 | Kim | B60H 1/00821 62/159 |
| 2004/0083747 A1 | 5/2004 | Shichiken et al. | |

(Continued)

FOREIGN PATENT DOCUMENTS

| | | |
|---|---|---|
| DE | 112017002430 B4 | 3/2022 |
| EP | 3192682 A2 | 7/2017 |

(Continued)

OTHER PUBLICATIONS

Office Action issued on Nov. 13, 2023 by the German Patent & Trademark Office in the corresponding Patent Application No. 11 2021 000 507.3, with English translation.

*Primary Examiner* — Avinash A Savani
*Assistant Examiner* — Dana K Tighe
(74) *Attorney, Agent, or Firm* — NORTON ROSE FULBRIGHT US LLP (57) ABSTRACT

The present invention relates to an air conditioner for a vehicle and, more particularly, to an air conditioner for a vehicle which is capable of miniaturization by integrally forming an air conditioning module and a cooling module so as to increase space utilization in an engine room and further enhance manufacturability.

13 Claims, 6 Drawing Sheets

(56) References Cited

U.S. PATENT DOCUMENTS

2014/0041829 A1    2/2014   Taniguchi et al.
2014/0069604 A1    3/2014   Tamakoshi

FOREIGN PATENT DOCUMENTS

| | | |
|---|---|---|
| JP | 2004098836 A | 4/2004 |
| JP | 2004149078 A | 5/2004 |
| JP | 2005186643 A | 7/2005 |
| JP | 2008074243 A | 4/2008 |
| KR | 101251206 B1 | 4/2013 |
| KR | 20160121730 A | 10/2016 |
| KR | 20190050564 A | 5/2019 |

\* cited by examiner

AIR CONDITIONER FOR VEHICLE

CROSS REFERENCE TO RELATED APPLICATIONS

This application is a national phase under 35 U.S.C. § 371 of International Application No. PCT/KR2021/002767 filed on Mar. 5, 2021, which claims the benefit of priority from Korean Patent Application No. 10-2020-0028234 filed on Mar. 6, 2020. The entire contents of these applications are incorporated herein by reference in their entirety.

TECHNICAL FIELD

The present invention relates to an air conditioner for a vehicle, and more particularly, to an air conditioner for a vehicle which may have a smaller size by including an air conditioning module and a cooling module integrally formed with each other, and thus have increased space utilization in an engine room and further enhanced manufacturability.

BACKGROUND ART

A typical air conditioner system for a vehicle may include the followings connected by a refrigerant pipe: a compressor compressing and delivering a refrigerant, a condenser condensing the high-pressure refrigerant delivered from the compressor, an expansion means throttling the refrigerant condensed and liquefied by the condenser, and an evaporator evaporating the low-pressure liquid refrigerant throttled by the expansion means by exchanging heat with air blown to a vehicle interior, to cool air discharged into the vehicle interior by using heat absorption by latent heat released when the refrigerant is evaporated, and the like.

The evaporator may be installed in an air conditioning case installed in the vehicle interior and serve to cool the interior. That is, the vehicle interior may be cooled when air blown by a blower is cooled by the latent heat which is released when the liquid refrigerant circulated in the evaporator is evaporated, while passing through the evaporator, and the cold air is discharged into the vehicle interior.

In addition, the vehicle interior may be heated using a heater core which is installed in the air conditioning case and in which an engine coolant is circulated, or an electric heating type heater installed in the air conditioning case.

Meanwhile, the condenser may be installed at a front portion of a vehicle to dissipate heat while exchanging heat with air.

Figure 1:
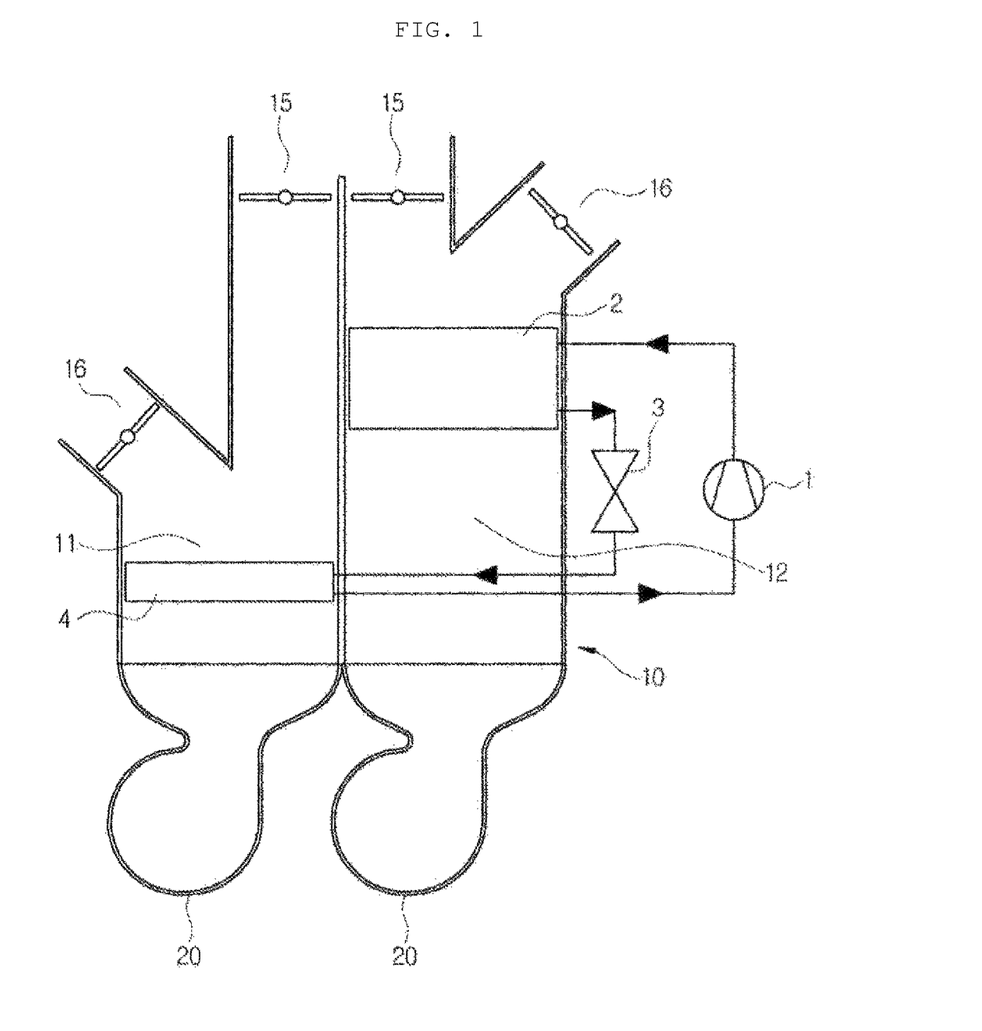
FIG. 1 is a view showing a prior vehicle heat pump system.

In recent years, a heat pump system that performs air cooling and heating by using only a refrigeration cycle has been developed. As shown in FIG. 1, the heat pump system may include a cold air passage 11 and a hot air passage 12 which are partitioned in one air conditioning case 10, an evaporator 4 for air cooling which is installed in the cold air passage 11 and a condenser 2 for air heating which is installed in the hot air passage 12. Here, an air outlet 15 for supplying air to the vehicle interior and an air discharge 16 for discharging air to a vehicle exterior may be positioned at an outlet of the air conditioning case 10. In addition, blowers 20 individually operated may respectively be installed at inlets of the cold air passage 11 and the hot air passage 12.

Therefore, in an air cooling mode, cold air cooled while passing through the evaporator 4 of the cold air passage 11 may be discharged to the vehicle interior through the air outlet 15 to cool the interior. Here, hot air heated while passing through the condenser 2 of the hot air passage 12 may be discharged to the vehicle exterior through the air discharge 16.

In an air heating mode, hot air heated while passing through the condenser 2 of the hot air passage 12 may be discharged to the vehicle interior through the air outlet 15 to heat the interior. Here, cold air cooled while passing through the evaporator 4 of the cold air passage 11 may be discharged to the vehicle exterior through the air discharge 16.

However, in the prior art, the blowers 20 may respectively be positioned in the cold air passage 11 and the hot air passage 12, air passing through the condenser 2 or the evaporator 4 may be required to be discharged through the air discharge based on an air cooling or heating setting, and the air discharge 16 equipped with a control door may thus be inevitably positioned in each of two places. Therefore, the heat pump system may inevitably have an increased overall size.

In addition, the condenser 2 installed in the air conditioning case may have a low condensing performance due to its inevitably small size. Therefore, the heat pump system may have a problem with its cooling performance.

Meanwhile, a front end module including a carrier, a cooling module and a headlamp may be positioned at a front portion of the vehicle. The cooling module may include a radiator, a condenser and a fan shroud, and heat may be exchanged between the radiator and the condenser through wind blown from the front portion of the vehicle.

Accordingly, required is a process for individually assembling the air conditioner and the cooling module to each other, and regions where the air conditioner is installed to actually perform air conditioning and the condenser of the cooling module is installed may be far away from each other, and may thus be connected to each other through a refrigerant line.

In recent years, a variety of new types of vehicles have been proposed, and in particular, there is an increasing demand for a method for effectively utilizing a space in an engine room.

RELATED ART DOCUMENT

Patent Document

Patent Document 1: Korean Patent No. 10-1251206 (entitled, "AIR-CONDITIONER WITHOUT STARTING THE ENGINE FOR VEHICLE")

DISCLOSURE

Technical Problem

An object of the present invention is to provide an air conditioner for a vehicle which may have a smaller size by including an air conditioning module and a cooling module integrally formed with each other to have increased space utilization in an engine room and further enhanced manufacturability.

Another object of the present invention is to provide an air conditioner for a vehicle in which exterior air introduced through an exterior air inlet may be supplied while being divided into air flowing to an air conditioning module and air flowing to a cooling module, and which may control flows of interior air and exterior air supplied to the air conditioning module by using an interior/exterior air controller.

Still another object of the present invention is to provide an air conditioner for a vehicle in which an air conditioning module has a first region and a second region positioned parallel to each other to have increased space utility and smoothly air-condition a vehicle interior, the first region being provided for blowing air in a width direction and the second region being provided with an evaporator for air cooling and a heat exchanger for air heating.

Yet another object of the present invention is to provide an air conditioner for a vehicle in which a cooling module is positioned in an entire region of an outer case (or all the first and second regions of an air conditioning module) in a width direction to sufficiently secure heat exchange performance of a radiator.

Still yet another object of the present invention is to provide an air conditioner for a vehicle in which a cooling module includes an exterior heat exchanger (i.e. condenser or variable heat exchanger) to minimize a refrigerant pipe, the exterior heat exchanger is positioned to correspond to a second region in a width direction while being adjacent and parallel to a radiator, and exterior air and engine-room air selectively pass through the air conditioner to have increased air cooling and heating efficiency.

Technical Solution

In one general aspect, an air conditioner 1000 for a vehicle includes: an air conditioning module M1 for cooling and heating a vehicle interior; and a cooling module M2 including a radiator 720 and a fan shroud 710 that forms a flow of air passing through the radiator 720, wherein the air conditioning module M1 and the cooling module M2 are integrally formed with each other and positioned in a vehicle engine room.

In addition, the air conditioner 1000 for a vehicle may be configured of: an outer case 110 including a through exterior air inlet 210 for introducing exterior air into the air conditioning module M1 and the cooling module M2, a through interior air inlet 220 for introducing interior air into the air conditioning module M1, and an air delivery part 240 for delivering air for cooling and heating the vehicle interior; and an inner case 120 partitioned from the outer case 110 to position the air conditioning module M1 therein, and allows exterior air introduced through the exterior air inlet 210 to be divided into an air flow passing through the cooling module M2 and an air flow passing through the air conditioning module M1.

In addition, in the air conditioner 1000 for a vehicle, the exterior air inlet 210 may be positioned in a lower side of the air conditioner in the height direction and simultaneously in one side of the air conditioner in the length direction, and exterior air introduced through the exterior air inlet 210 may pass through the cooling module M2 to be discharged to the other side of the air conditioner in the length direction.

In addition, the air conditioning module M1 may have a first region 101 and a second region 102 positioned parallel to each other in the width direction, the first region 101 being provided with an interior/exterior air controller 230 for selectively supplying exterior air introduced through the exterior air inlet 210 and interior air introduced through the interior air inlet 220, and a blower 400 for blowing air to the air conditioning module M1; and the second region 102 being provided with an evaporator 510 for air cooling and a heat exchanger 520 for air heating to exchange heat with air supplied from the first region 101 and then supply heat-exchanged air through the air delivery part 24.

In addition, in the air conditioner 1000 for a vehicle, the interior air inlet 220 and the air delivery part 240 may be positioned on an upper side of the outer case 110 while being parallel to each other in the width direction.

In addition, the cooling module M2 may be positioned in an entire region of the outer case 110 in the width direction.

In addition, the interior/exterior air controller 230 may include a through portion 210a which is a certain through region of the inner case 120 for introducing some of exterior air introduced through the exterior air inlet 210 into the first region 101, the interior air inlet 220, and a first control door 231 for controlling flows of exterior air and interior air respectively introduced through the through portion 210a and the interior air inlet 220.

In addition, the air conditioning module M1 may include a filter 300 positioned between the interior/exterior air controller 230 and the blower 400 in the first region 101.

In addition, the cooling module M2 may include an exterior heat exchanger 730.

In addition, in the air conditioner 1000 for a vehicle, the exterior heat exchanger 730 may be positioned to correspond to the second region 102 in the width direction while being adjacent and parallel to the radiator 720.

In addition, the exterior heat exchanger 730 may be mounted in the inner case 120 or the outer case 110.

In addition, the air conditioner 1000 for a vehicle may include an engine-room air inlet 250 and a second control door 251 to control air supplied to the exterior heat exchanger 730, the engine-room air inlet 250 introducing air inside the engine room; and the second control door 251 controlling flows of exterior air and engine-room air which are respectively introduced through the exterior air inlet 210 and the engine room air inlet 250.

In addition, the air conditioner 1000 for a vehicle may further include an auxiliary heating heat exchanger 530 positioned at the rear of the heat exchanger 520 in an air flow direction.

In addition, in the air conditioner 1000 for a vehicle, the heat exchanger 520 may be positioned in a horizontal direction.

Advantageous Effects

As set forth above, the air conditioner for a vehicle according to the present invention may have a smaller size by including the air conditioning module and the cooling module integrally formed with each other to have the increased space utilization in the engine room and the further enhanced manufacturability.

In addition, in the air conditioner for a vehicle according to the present invention, the exterior air introduced through the exterior air inlet may be supplied while being divided into air flowing to the air conditioning module and air flowing to the cooling module, and the air conditioner may control the flows of the interior air and the exterior air supplied to the air conditioning module by using the interior/exterior air controller.

In addition, in the air conditioner for a vehicle according to the present invention, the air conditioning module has the first region and the second region positioned parallel to each other to have the increased space utility and smoothly air-condition the vehicle interior, the first region being provided for blowing air in a width direction and the second region being provided with the evaporator for air cooling and the heat exchanger for air heating.

In addition, in the air conditioner for a vehicle according to the present invention, the cooling module may be positioned in the entire region of the outer case (or all the first and second regions of the air conditioning module) in the width direction, and the air conditioner may thus sufficiently secure the heat exchange performance of the radiator.

In addition, in the air conditioner for a vehicle according to the present invention, the cooling module may include the exterior heat exchanger (i.e. condenser or variable heat exchanger) to minimize the refrigerant pipe, the exterior heat exchanger may be positioned to correspond to the second region in the width direction while being adjacent and parallel to the radiator, and the exterior air and the engine-room air may selectively pass through the air conditioner, and the air conditioner may thus have the increased air cooling and heating efficiency.

BEST MODE

Hereinafter, an air conditioner 1000 for a vehicle, having the configuration as described above will be described in detail with reference to the accompanying drawings.

Figure 2:
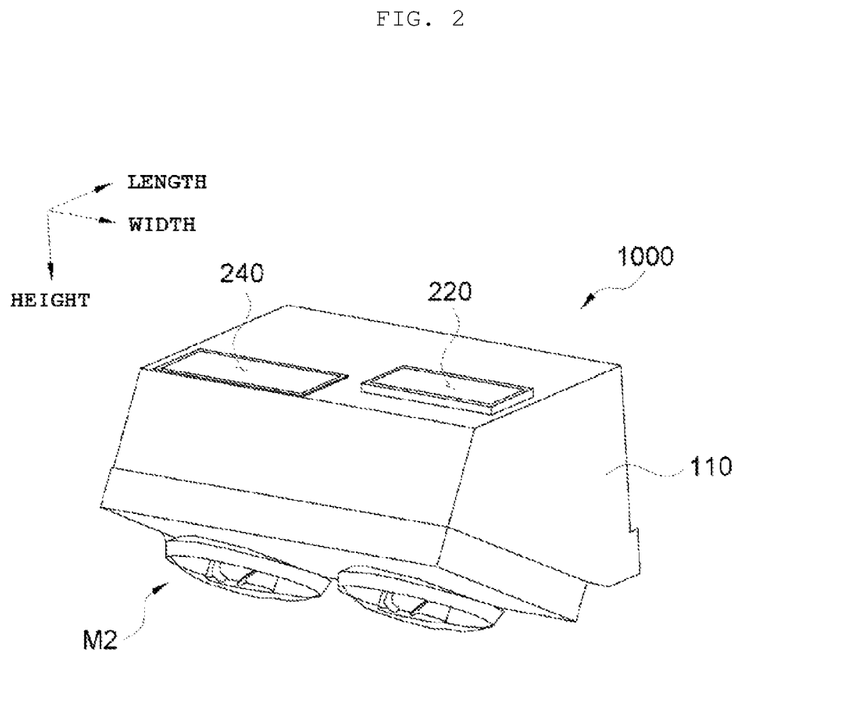
FIG. 2 is a perspective view of an air conditioner for a vehicle according to the present invention.
Figure 3:
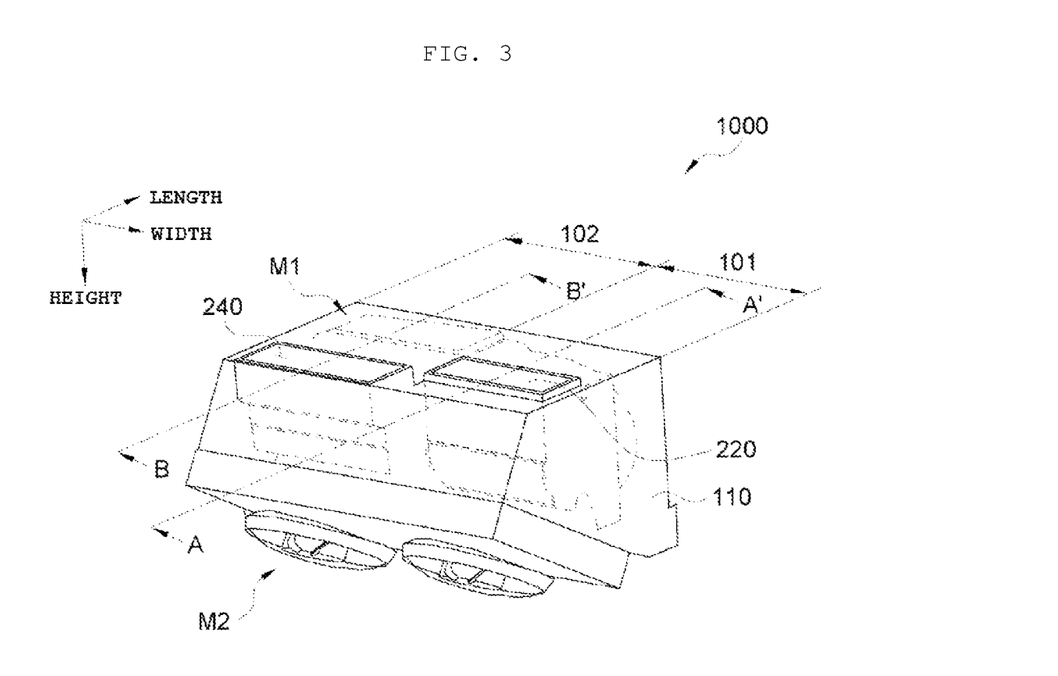
FIG. 3 is a transmission perspective view of the air conditioner for a vehicle according to the present invention.
Figure 4:
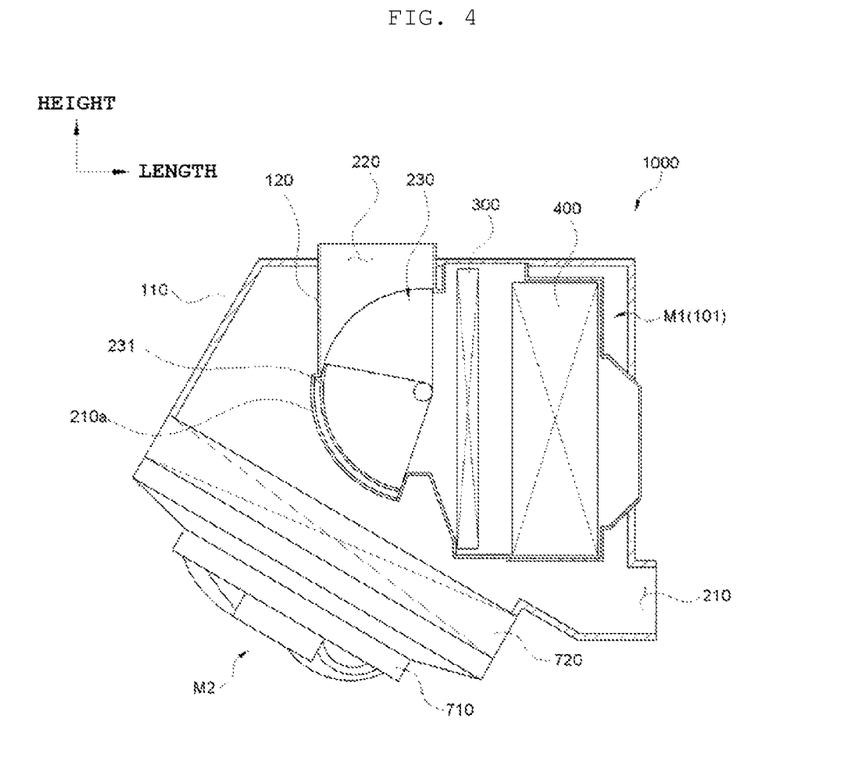
FIGS. 4 and 5 are views respectively taken along direction AA' and direction BB' of the air conditioner for a vehicle according to the present invention.
Figure 5:
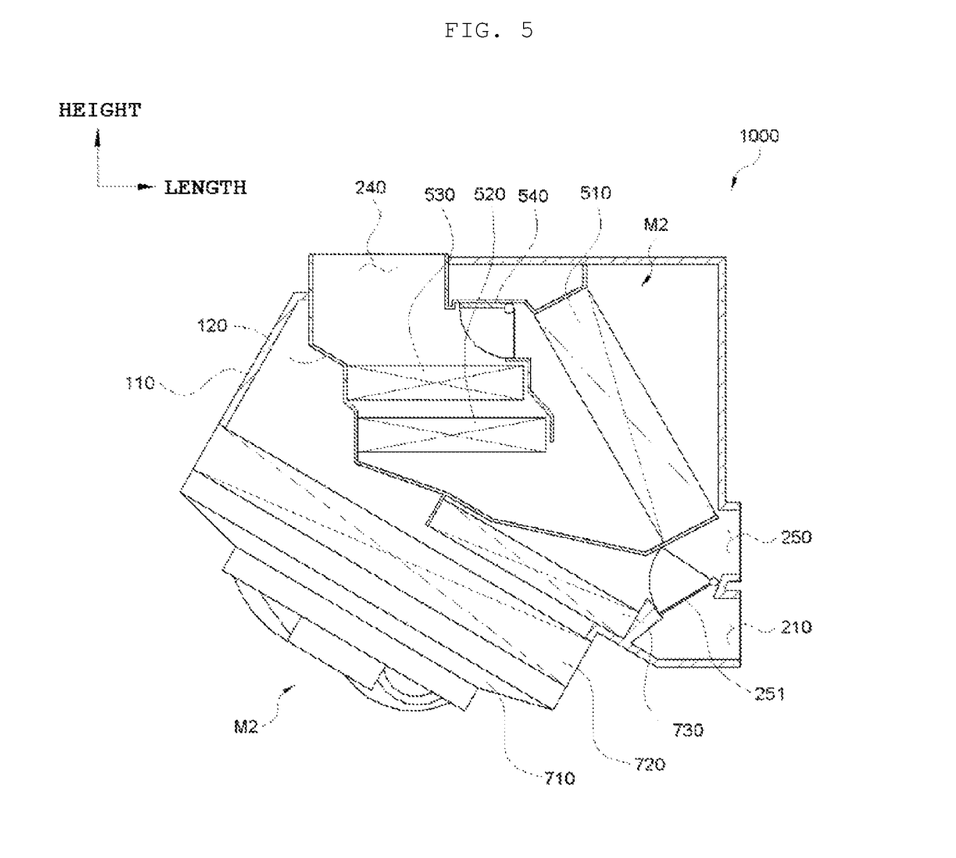
Figure 6:
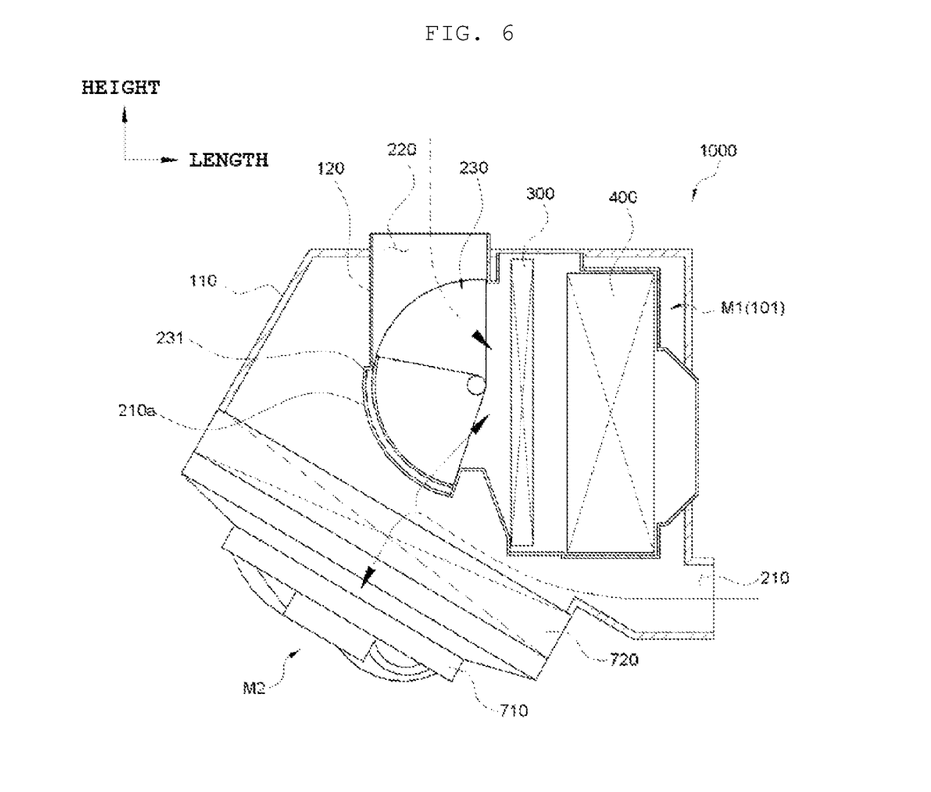
FIG. 6 is a view showing flows of interior air and exterior air of the air conditioner for a vehicle according to the present invention.

FIG. 2 is a perspective view of the air conditioner 1000 for a vehicle according to the present invention; FIG. 3 is a transmission perspective view of the air conditioner 1000 for a vehicle according to the present invention; FIGS. 4 and 5 are views respectively taken along direction AA' and direction BB' of the air conditioner 1000 for a vehicle according to the present invention; and FIG. 6 is a view showing flows of interior air and exterior air of the air conditioner for a vehicle according to the present invention.

In the air conditioner 1000 for a vehicle of the present invention, an air conditioning module M1 and a cooling module M2 may be integrally formed with each other and positioned in a vehicle engine room.

First, the air conditioning module M1 may be a component for cooling and heating a vehicle interior, and the cooling module M2 may be a component including a radiator 720 and a fan shroud 710 that forms a flow of air passing through the radiator 720. Accordingly, the air conditioner 1000 for a vehicle of the present invention may not require a process or space for separately mounting the cooling module M2 because the cooling module M2, which is supposed to be conventionally positioned at a front portion of the vehicle, may be mounted on the air conditioner together with the air conditioning module M1 integrally formed therewith.

In the radiator 720, a coolant for cooling an engine may flow, and a coolant for cooling various electronic components positioned in the engine room may flow.

In more detail, the air conditioner 1000 for a vehicle of the present invention may be configured of an outer case 110 and an inner case 120.

The outer case 110 may be an external basic body of the air conditioner 1000 for a vehicle, and include an exterior air inlet 210, an interior air inlet 220 and an air delivery part 240.

The exterior air inlet 210 may be a space which is a certain through region of the outer case 110 for introducing exterior air, and air introduced through the exterior air inlet 210 may be supplied to the air conditioning module M1 and the cooling module M2.

The interior air inlet 220 may be a space in which a certain through region of the outer case 110 for introducing interior air, and the interior air may be introduced into the air conditioning module M1.

Here, the exterior air inlet 210 may be positioned on a lower side of the air conditioner in the height direction. Exterior air may thus be introduced into the outer case 110 while being delivered in the length direction, some of exterior air may pass through the cooling module M2, and the rest may be selectively supplied to the air conditioning module M1. That is, in the cooling module M2, exterior air may be introduced into a region between the outer case 110 and the inner case 120 by the exterior air inlet 210 positioned in the lower side of the air conditioner in the height direction and simultaneously in one side thereof in the length direction, and pass through the cooling module M2 to be discharged to the other side of the air conditioner in the length direction. In other words, exterior air introduced through the exterior air inlet 210 may pass by an operation of the fan shroud 710 to exchange heat with the coolant in the radiator 720.

(In FIG. 6, a flow of the exterior air is indicated by a solid arrow, and a flow of the interior air is indicated by a dotted arrow).

The cooling module M2 may be positioned in an entire region of the outer case 110 in the width direction to sufficiently secure heat exchange performance of the radiator 720. To this end, the exterior air inlet 210 may also be positioned long in the width direction.

Here, the air conditioning module M1 may be used by introducing exterior air introduced through the exterior air inlet 210 thereinto. That is, the air conditioning module M1 may cool or heat the interior by exchanging heat with exterior air or interior air each introduced through the exterior air inlet 210 or the interior air inlet 220. The flows of exterior air and interior air which are introduced into the air conditioning module M1 may be controlled by an interior/exterior air controller 230, and a specific configuration thereof is described again below.

The air delivery part 240 may be a certain through region of the outer case 110 for delivering air heat-exchanged in the air conditioning module M1 (or air for cooling the vehicle interior).

Here, the interior air inlet 220 and the air delivery part 240 may be positioned in an upper side of the outer case 110 while being parallel to each other in the width direction.

The inner case 120 may be a space partitioned from the outer case 110 to position the air conditioning module M1 therein, and in which components for allowing air to be introduced into the air conditioning module M1, an evaporator 510 for air cooling, a heat exchanger 520 for air heating, and the like may be built.

That is, the air conditioning module M1 positioned in the inner case 120 may have a first region 101 and a second region 102 positioned parallel to each other in the width direction.

The first region 101 may be provided with an interior/exterior air controller 230 and a blower 400 to introduce exterior air or interior air into the air conditioning module M1.

The interior/exterior air controller 230 may include a through portion 210a which is a certain through region of the inner case 120 for introducing some of exterior air introduced through the exterior air inlet 210 into the first region 101, the interior air inlet 220, and a first control door 231 for controlling the flows of exterior air and interior air respectively introduced through the through portion 210a and the interior air inlet 220.

In the air conditioner 1000 for a vehicle, exterior air may pass through the cooling module M2 by being delivered from one side to the other side of a portion where the first region 101 is positioned in the length direction through the exterior air inlet 210 which is positioned below the inner case 120, i.e. in a region between the inner case 120 and the outer case 110. Some of exterior air may then be supplied into the first region 101 of the air conditioning module M1 through the through portion 210a by an operation of the first control door 231 of the interior/exterior air controller 230.

The blower 400 may introduce exterior air or interior air into the air conditioning module M1.

In addition, the air conditioning module M1 may include a filter 300 positioned between the interior/exterior air controller 230 and the blower 400 of the first region 101, and the filter 300 may have a form enabling the filter to be replaced, a form enabling the filter to electrically collect dust or the like, and is not limited to any particular form.

The second region 102 may be provided with an evaporator 510 for air cooling and a heat exchanger 520 for air heating to exchange heat with air supplied from the first region 101 and then supply heat-exchanged air through the air delivery part 240.

The evaporator 510 may cool air discharged to the vehicle interior through the air delivery part 240. Here, when the air cooling is performed, a refrigerant in a wet state of low temperature and low pressure may be supplied to the evaporator 510, and air may be cooled while passing through the evaporator 510 to be discharged to the vehicle interior. On the other hand, when the air heating is performed, the refrigerant may not be supplied to the evaporator 510, such that even though air passes through the evaporator 510, a temperature may not be changed.

The heat exchanger 520 may heat air discharged to the vehicle interior through the air delivery part 240. Here, the heat exchanger 520 may be a heater core to which a heated coolant is supplied, or may be the interior heat exchanger 520 of a heat pump system.

Here, the second region 102 may further be provided with a temp door 540 that determines whether air-conditioning air passing through the evaporator 510 passes through the heat exchanger 520.

The heat exchanger 520 may be positioned in a horizontal direction. The horizontal direction may refer to a direction perpendicular to the height direction, and the above-described space into which exterior air is introduced may be positioned outside and below the inner case 120, and the cooling module M2 may be positioned below the space to reduce an overall size of the air conditioner. Here, in the cooling module M2, the radiator 720 and the fan shroud 710 may be positioned below the heat exchanger 520 in consideration of a size of the radiator 720 or the like, and may each be positioned to have one side inclined downward in the horizontal direction.

The air conditioner 1000 for a vehicle of the present invention may further include an auxiliary heating heat exchanger 530 positioned at the rear of the heat exchanger 520 in the air flow direction. The auxiliary heating heat exchanger 530 may be a component performing the air heating together with the heat exchanger 520, and use various types including a positive temperature coefficient (PTC) heating means. The auxiliary heating heat exchanger 530 may also be positioned in the horizontal direction like the heat exchanger 520, and may be positioned above and parallel to the heat exchanger 520 positioned at a rear portion of the air conditioner in the air flow direction.

In the air conditioner 1000 for a vehicle of the present invention, the cooling module M2 may further include an exterior heat exchanger 730.

In the present invention, the exterior heat exchanger 730 may refer to another heat exchanger 520 positioned outside the inner case 120, and may be a condenser for the air cooling performed by the evaporator 510 while the refrigerant sequentially passes through the compressor, the condenser, the expansion means, and then the evaporator 510.

Alternatively, the exterior heat exchanger 730 may be a variable heat exchanger 520 whose role in the heat pump system is variable. The variable exterior heat exchanger 730 may not be a component for cooling or heating air for the actual cooling and heating, and may condense the refrigerant supplied to the evaporator 510 based on an air cooling setting, or evaporate the refrigerant supplied to the heat exchanger 520 based on an air heating setting.

The exterior heat exchanger 730 may be positioned in a lower region of the air conditioner while being adjacent and parallel to the radiator 720, and positioned to correspond to the second region 102, where the blower 400 having a relatively large size is not positioned. That is, the exterior heat exchanger 730 may be positioned below the inner case 120, and may also be mounted in the header tank of the radiator 720 or the fan shroud 710 of the cooling module M2, as in the prior art, or may be mounted in the inner case 120 or the outer case 110. In FIG. 5, the exterior heat exchanger 730 may have an upper side supported by the inner case 120 and a lower side mounted in and supported by the outer case 110, and may be positioned in more various other ways.

When including the exterior heat exchanger 730 positioned therein, the air conditioner may include an engine-room air inlet 250, and a second control door 251 for controlling flows of exterior air and engine-room air which are respectively introduced through the exterior air inlet 210 and the engine room air inlet 250 so that air inside the engine room selectively passes through the exterior heat exchanger 730 and the radiator 720 sequentially.

The engine-room air inlet 250 may be adjacent to the exterior air inlet 210 of the second region 102 and a through portion for introducing engine-room air thereinto, and the second control door 251 may selectively control an opening degree of the engine room air inlet 250 and the exterior air inlet 210.

That is, the exterior air inlet 210 may be positioned over the first region 101 and the second region 102 to be long in the width direction. When supplied, exterior air introduced through the exterior air inlet 210 positioned to correspond to the first region 101 may be supplied to the cooling module M2 or the air conditioning module M1, and exterior air selectively introduced through the exterior air inlet 210 positioned to correspond to the second region 102 may pass through the exterior heat exchanger 730 and the radiator 720 sequentially.

In particular, in the winter when the exterior temperature is low, air inside the engine room may be heated by operations of various electronic components and maintain a temperature higher than the exterior temperature. As such, the engine-room air inlet 250 and the second control door 251 may be positioned in the air conditioner 1000 for a vehicle of the present invention and supply air inside the engine room into the outer case 110 to increase evaporation performance (or heat absorption amount) of the exterior heat exchanger 730, thus further increasing the air heating performance of the heat exchanger 520.

As described above, the air conditioner 1000 for a vehicle of the present invention may have a smaller size by including the air conditioning module M1 and the cooling module M2 integrally formed with each other, have further enhanced manufacturability, smoothly air-condition the vehicle interior, and easily cool the electronic components and the like.

The present invention is not limited to the above-mentioned embodiments, and may be variously applied. In addition, the present invention may be variously modified by those skilled in the art to which the present invention pertains without departing from the gist of the present invention claimed in the claims.

DESCRIPTION OF REFERENCE NUMERALS

1000: air conditioner for vehicle, 101: first region, 102: second region,
110: outer case, 120: inner case, M1: air conditioning module,
210: exterior air inlet, 210a: through portion, 220: interior air inlet,
230: interior/exterior air controller, 231: first control door,
240: air delivery part,
250: engine-room air inlet, 251: second control door, 300: filter,
400: blower, 510: evaporator, 520: heat exchanger,
530: auxiliary heating heat exchanger, 540: temp door, M2: cooling module,
710: fan shroud, 720: radiator, 730: exterior heat exchanger

The invention claimed is:

1. An air conditioner for a vehicle, comprising:
an air conditioning module for cooling and heating a vehicle interior; and
a cooling module including a radiator and a fan shroud that forms a flow of air passing through the radiator,
wherein the air conditioning module and the cooling module are integrally formed with each other and positioned in a vehicle engine room,
wherein the air conditioner comprises:
an outer case including a through an exterior air inlet for introducing the exterior air into the air conditioning module and the cooling module, a through interior air inlet for introducing the interior air into the air conditioning module, and an air delivery part for delivering air for cooling and heating the vehicle interior; and
an inner case partitioned from the outer case to position the air conditioning module therein, and allows the exterior air introduced through the exterior air inlet to be divided into an air flow passing through the cooling module and an air flow passing through the air conditioning module,
wherein the exterior air inlet is positioned in a lower side of the air conditioner in a height direction and simultaneously in one side of the air conditioner in a length direction, and exterior air introduced through the exterior air inlet passes through the cooling module to be discharged to the other side of the air conditioner in the length direction.

2. The air conditioner for the vehicle of claim 1, wherein the air conditioning module has a first region and a second region positioned parallel to each other in the width direction,
the first region being provided with an interior/exterior air controller for selectively supplying the exterior air introduced through the exterior air inlet and the interior air introduced through the interior air inlet, and a blower for blowing air to the air conditioning module M1; and
the second region being provided with an evaporator for air cooling and a heat exchanger for air heating to exchange heat with air supplied from the first region and then supply heat-exchanged air through the air delivery part.

3. The air conditioner for the vehicle of claim 2, wherein in the air conditioner for a vehicle, the interior air inlet and the air delivery part are positioned on an upper side of the outer case while being parallel to each other in the width direction.

4. The air conditioner for the vehicle of claim 2, wherein the cooling module is positioned in an entire region of the outer case in the width direction.

5. The air conditioner for the vehicle of claim 2, wherein the interior/exterior air controller includes
a through portion which is a certain through region of the inner case for introducing some of the exterior air introduced through the exterior air inlet into the first region,
the interior air inlet, and
a first control door for controlling flows of the exterior air and the interior air respectively introduced through the through portion and the interior air inlet.

6. The air conditioner for the vehicle of claim 5, wherein the air conditioning module includes a filter positioned between the interior/exterior air controller and the blower in the first region.

7. The air conditioner for the vehicle of claim 2, wherein the cooling module includes an exterior heat exchanger.

8. The air conditioner for the vehicle of claim 7, wherein in the air conditioner for a vehicle, the exterior heat exchanger is positioned to correspond to the second region in the width direction while being adjacent and parallel to the radiator.

9. The air conditioner for the vehicle of claim 8, wherein the exterior heat exchanger is mounted in the inner case or the outer case.

10. The air conditioner for the vehicle of claim 8, comprising an engine-room air inlet and a second control door to control air supplied to the exterior heat exchanger,
the engine-room air inlet introducing air inside the engine room; and
the second control door controlling flows of the exterior air and the air inside the engine-room which are respectively introduced through the exterior air inlet and the engine room air inlet.

11. The air conditioner for the vehicle of claim 2, further comprising an auxiliary heating heat exchanger positioned at a rear of the heat exchanger in an air flow direction.

12. The air conditioner for the vehicle of claim 2, wherein the heat exchanger is positioned in a horizontal direction.

13. An air conditioner for a vehicle, comprising:
an air conditioning module for cooling and heating a vehicle interior; and
a cooling module including a radiator and a fan shroud that forms a flow of air passing through the radiator, wherein the air conditioning module and the cooling module are integrally formed with each other and positioned in a vehicle engine room, wherein the air conditioner comprises:
- an outer case including a through an exterior air inlet for introducing the exterior air into the air conditioning module and the cooling module, a through interior air inlet for introducing the interior air into the air conditioning module, and an air delivery part for delivering air for cooling and heating the vehicle interior; and
- an inner case partitioned from the outer case to position the air conditioning module therein, and allows the exterior air introduced through the exterior air inlet to be divided into an air flow passing through the cooling module and an air flow passing through the air conditioning module, wherein the air conditioning module has a first region and a second region positioned parallel to each other in the width direction, the first region being provided with an interior/exterior air controller for selectively supplying the exterior air introduced through the exterior air inlet and the interior air introduced through the interior air inlet, and a blower for blowing air to the air conditioning module, and the second region being provided with an evaporator for air cooling and a heat exchanger for air heating to exchange heat with air supplied from the first region and then supply heat-exchanged air through the air delivery part.

\* \* \* \* \*